United States Patent [19]
Becker

[11] Patent Number: 5,983,145
[45] Date of Patent: Nov. 9, 1999

[54] METHOD FOR THE COURSE CONTROL OF MARINE VESSELS OVER GROUND

[75] Inventor: Christoph Becker, Kiel, Germany

[73] Assignee: Raytheon Marine G.m.b.H., Germany

[21] Appl. No.: 08/868,841

[22] Filed: Jun. 9, 1997

[30] Foreign Application Priority Data

Jun. 26, 1996 [DE] Germany .......................... 196 25 561

[51] Int. Cl.$^6$ .......................... G01C 21/20; G05D 01/02
[52] U.S. Cl. .................. 701/21; 701/26; 701/24
[58] Field of Search ................. 701/21, 23, 24,
701/25, 26, 41, 208, 213, 214, 219, 224;
342/357; 340/988, 990, 995

[56] References Cited

U.S. PATENT DOCUMENTS 3,737,635 6/1973 Hastings .................................. 701/219
4,253,149 2/1981 Cunningham et al. .................. 701/21
4,768,153 8/1988 Akamatsu .............................. 701/207
5,523,951 6/1996 Kriesgman et al. .................... 342/357

*Primary Examiner*—Tan Nguyen
*Attorney, Agent, or Firm*—Shlesinger, Fitzsimmons & Shlesinger

[57] ABSTRACT

The desired course line or rhumb line of a ship is predetermined just before the ship leaves a harbor and is inputted to the autopilot of a ship's automatic course control unit. When the ship is underway a gyro compass indicates the course of the ship during its movement out of the harbor and a position receiver in the control unit generates signals responding to the actual position of the ship (its heading) and supplies the signals to a computer unit which senses any deviation of the ship due to its lateral drift from the predetermined course line. In response to the signals the autopilot computes a new course necessary to correct the course of the ship, and automatically adjusts the heading of the ship to the new course to return the ship to the predetermined course line.

1 Claim, 2 Drawing Sheets

METHOD FOR THE COURSE CONTROL OF MARINE VESSELS OVER GROUND

BACKGROUND OF THE INVENTION

The invention concerns a method for the course control of marine vessels over ground in accordance with the preamble to claim 1, in particular for the course control of ships.

Such a method provides for the manual or partly automatic input of a course line, i.e. the route of the ship, which the marine vessel, such as a ship, should adopt, without the use of prepared computer data from an electronic navigational chart or the like. In addition, an autopilot is needed, which can control the ship automatically on a desired course, as well as a position receiver system, for example a position receiver on the market, which constantly determines the momentary actual position of the marine vessel, such as a ship.

A determination of the desired course line over ground would be possible by the input of geographical coordinates from a navigational chart into a computer, in which respectively two coordinate data are determined and fed in to establish a particular position point.

On the course of the marine vessel, such as a ship, which is determined by these geographical coordinates, also named course over ground, the marine vessel is guided by means of a course control unit. A course which is determined by such coordinates consists, as a rule, of a plurality of course segments.

Such a course control unit is offered throughout the world by many firms. It is controlled by the geographical coordinates of the course over ground which is determined. On the basis of these data, a course error computation is carried out, the course is then fed into the autopilot, which corrects this error for its part. This process is costly because of the method of the determination of coordinates on a course planning medium for the definition of the course line over ground.

A normal autopilot only controls the course of the ship through the water. With an existing drift, the ship is laterally displaced against the course line which is desired and determined in the navigational chart.

The invention is based on the object of designing a method in accordance with the preamble to claim 1 so that preplanning of the course line by geographical coordinates and the electronic data input, for example from an electronic navigational chart, can be dispensed with, but a course control is only carried out on the basis of a manually or partly automatic input of the course over ground, and in which a lateral drift of the ship can be determined and corrected.

SUMMARY OF THE INVENTION

In the subject of the invention, on the one hand the actual course of a ship or another marine vessel is determined continuously or at cyclical intervals of time; from this the angle of incidence of the longitudinal axis of the ship to the desired predetermined course line over ground is defined. On the other hand, also continuously or at cyclical intervals of time, the respective actual position of the ship is detected by a position receiver. By computer comparison of the actual position and of the actual course of the ship (heading) with the predetermined course over ground, a lateral drift can be defined. On the basis of this deviation, a correction signal can be computed in order to compensate for this lateral drift and to return to the desired rated course line over ground.

This is done by correction of the actual course or heading, i.e. by correction of the angle of incidence of the ship, more precisely of the longitudinal axis of the ship, to the predetermined and stored course line over ground.

At the start of the automatic course control for drift correction, on the basis of the actual position of the ship and of the ship's actual course, i.e. the alignment of the ship's longitudinal axis to a reference angle, a rated course line in form of a rhumb line is determined. A rhumb line shows a constant angle to the meridians on a sphere. The control is carried out along this rated course line. During a movement along a rhumb line a gyro compass indicates a constant course.

A position receiver determines the actual position signal or signals of the ship and supplies them to a memory and computer unit.

In this connection a possible deviation of the ship from the defined course line is determined. This can be done by simple projection of the actual position of the ship on the course line. A firmly defined target coordinate or a target are not necessary here.

The memory and computer unit of the autopilot then computes, in certain circumstances, a corrected rated course line and a new angle of incidence of the ship to the rated course line. The autopilot then leads the ship automatically back to the rated course which was determined at the start.

These functions can be integrated by corresponding circuit and/or software design of the autopilot in the latter.

The input of the course line is carried out by storing the actual position of the ship as well as storing the actual course of the ship. Thereby the course over ground is clearly defined. This input can preferably be carried out shortly before leaving the harbour. The determination of this course line is carried out within the autopilot.

Via a projection procedure a position on the course line with a minimum distance to the actual position of the ship is determined from the actual position of the ship and the course line over ground. From the position supplied by the projection procedure and the actual position of the ship the distance of the ship to the given course line is calculated.

The previous costly methods for the determination of a course line over ground, which require a determination of geographical coordinates in a navigational chart of paper, or in an electronic navigational chart, a radar, or a position receiver, are thereby no longer necessary. The relevant planning of position points, at least respectively one position point in advance, also lapses. These data, which are the condition for course control by a normal autopilot, are superfluous.

The special feature consists of an automatic system which is newly built in to the autopilot for its independent generation of a course line over ground, connected with the different actions for the determination of this course over ground. This concerns an automatic, course-oriented determination of the course line which is not determined by an operator on the basis of geographical coordinates.

Only taking a bearing over the bows of the ship or a simple glance at a radar are sufficient to ensure whether this course is free from obstacles or dangers. Then the automatic course correction within the autopilot, which is also described as "drift corrected course control", is activated.

The method is simple and it takes account of the primordial wish of navigators to follow the desired course line marked on the navigational chart directly and without displacement by drift.

One embodiment example of the invention is shown in the drawing.

DETAILED DESCRIPTION OF THE INVENTION

Figure 1:
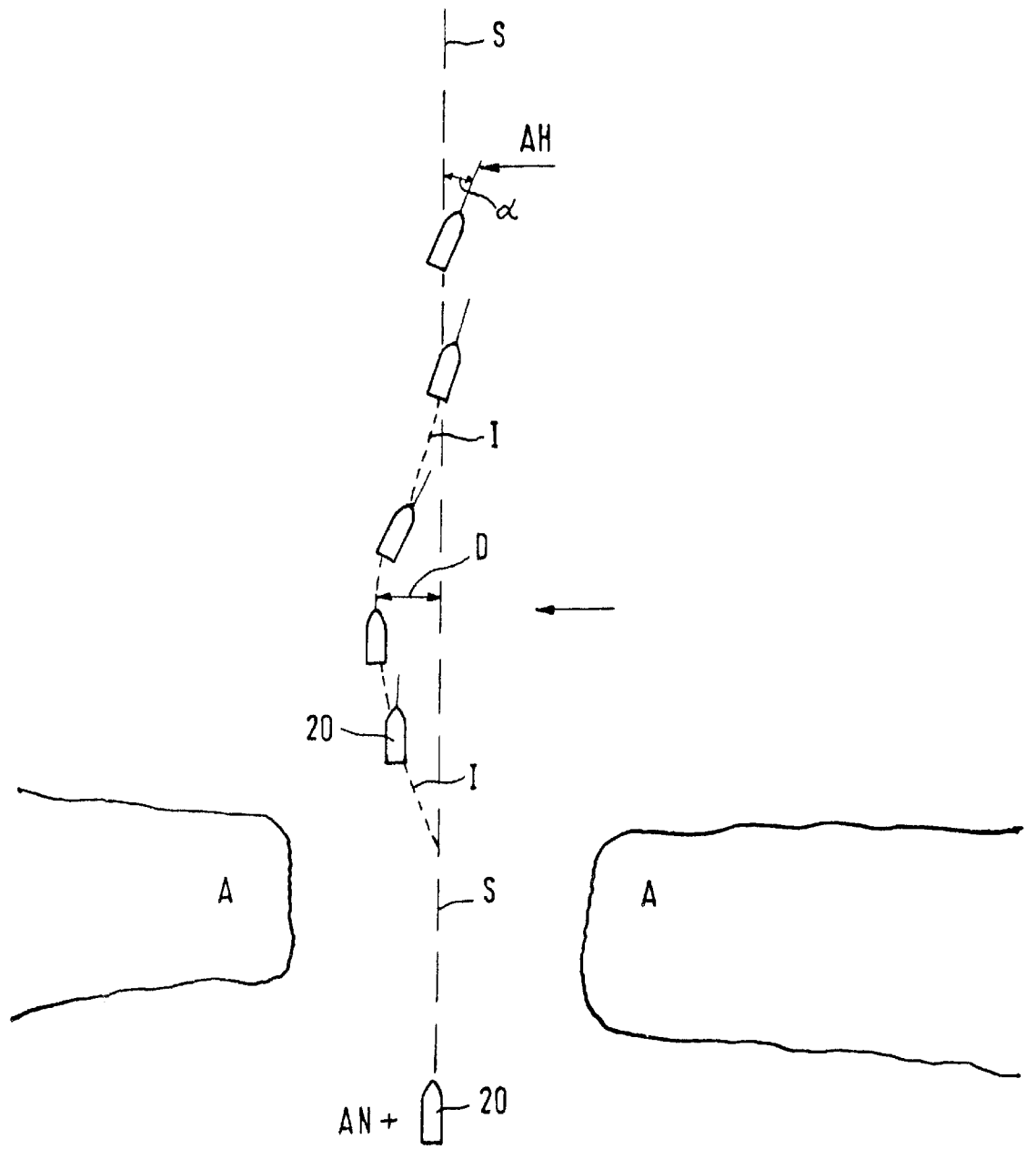
FIG. 1 shows the path of a ship along a course in a schematic form.

FIG. 1 shows a plan view of the course of a ship 20 out of the harbour H. Before passing the exit from the harbour A—A, the automatic, drift-correcting course control AN is activated. Thereby before leaving the harbor the desired course line S is determined by the actual position of the ship and the actual course of the marine vessel.

In order to check whether the sea space along the course line is free or not, a simple glance over the bows or at the radar screen is sufficient. In the diagram of FIG. 1, the ship is initially exactly on the desired course line, after but the exit from the harbour A—A, it drifts because of a drift from the right, whether caused by winds or currents, to the left as far as amount D. The control system, which in addition to the actual heading measures continuously or at cyclical intervals of time the position of the ship, can determine this lateral displacement or drift by computation by reference to the input desired course line over ground and can automatically correspondingly adjust the actual heading, and therefore the direction of the longitudinal axis of the ship to the desired course line over ground, so that the ship moves onto this course and after attaining it moves by the corresponding minor correction of the actual heading AH onto the desired course line.

Figure 2:
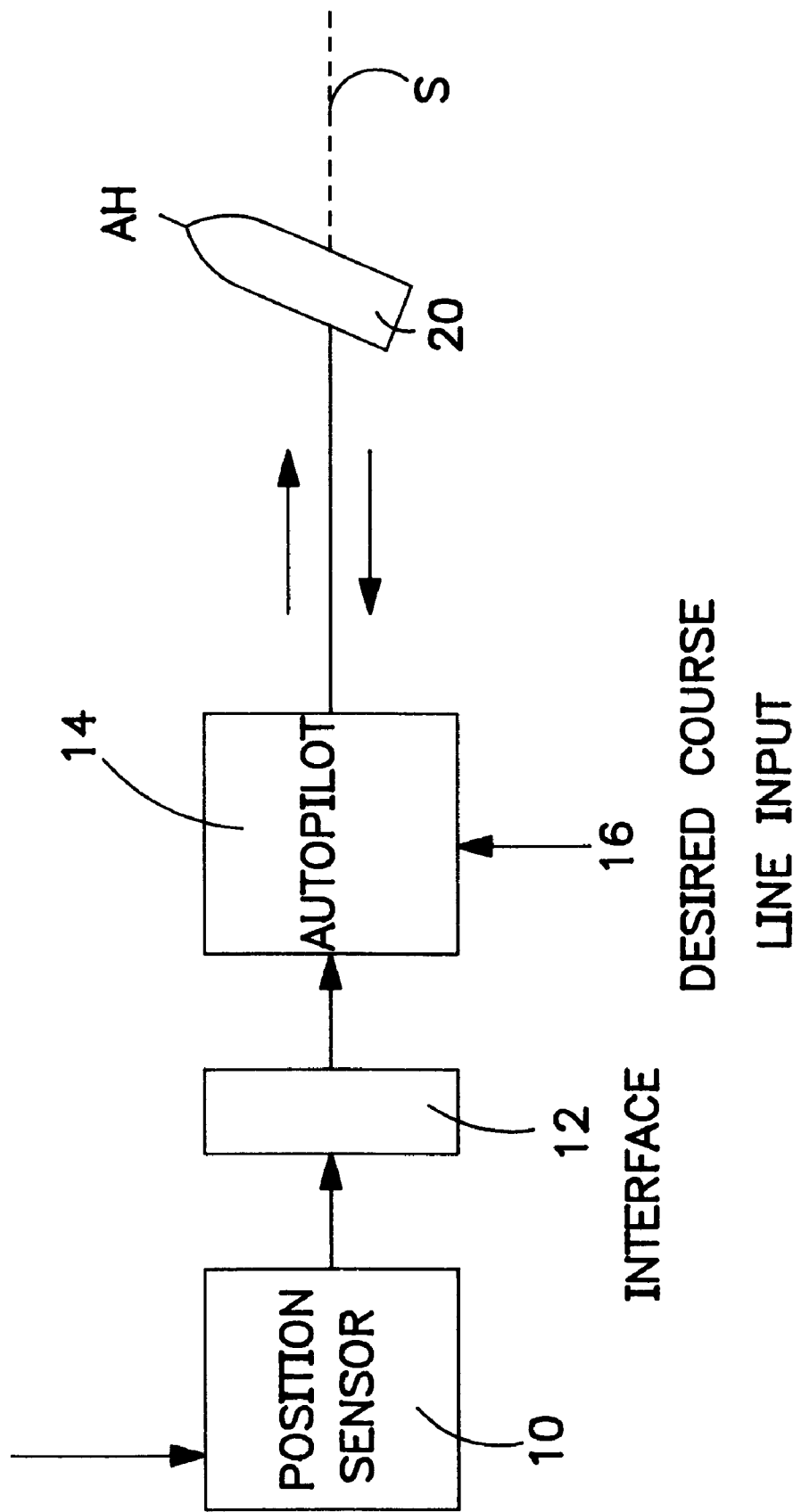
FIG. 2 shows a rough circuit diagram.

FIG. 2 shows a rough circuit diagram for a preferred example of an embodiment of the invention. The circuit is formed by an autopilot or automatic pilot 14, to which initially the desired course line over ground 16 is imported or fed in manually or partly automatically. In order to adhere to the desired course line S, the actual course and/or the actual heading AH of the ship, as represented by its longitudinal centerline, frequently has to be corrected from an inclined position to the desired course line S.

What is new is the determination of the course line to be steered over ground in the autopilot 14, or in another automatic control unit, which is defined by the actual position of the ship and by the actual course (heading) of the ship or of another marine vessel in the autopilot. What is new is also the supply as well as the evaluation of position data from a position sensor in the autopilot which, as a rule, can be prepared by a corresponding connection member or interface 12, in which the interface 12 can be a component part of the autopilot 14.

In addition a novel feature is a computer and memory unit—not shown separately—preferably within the autopilot 14, which compares the position data of the ship which are supplied continuously or at cyclical intervals of time by the position sensor 10 with the course line determined over ground and computes therefrom a possible lateral deviation of the ship's position against the defined course line over ground. From this in turn, a necessary angle incidence of the longitudinal axis of the ship is computed against the course line over ground which was determined. The autopilot alters the actual course of the ship correspondingly, so that the ship moves toward the course line over ground which was defined, attains it and keeps the ship on the defined course line over ground because of this method.

I claim:

1. A method for effecting automatic course control of marine vessels, such as ships, over ground in a course line which is predetermined manually or party automatically by means of an automatic course control unit, characterized in (a) predetermining the course line (S) over ground of a ship at the beginning of a drift-correcting automatic course control thereof on the basis of the actual position of the ship and of its actual course at said beginning, and employing a gyro compass that indicates a constant course of the ship during its movement along said course line, (b) using the course line (S) in the course control as a rated course or predetermined line, along which the course control steers the ship, (c) employing a position receiver (10) to generate signals continuously or at cyclical intervals of time corresponding to the actual position of the ship (20) and supplying the signals to a memory and computer unit of an autopilot (14) via an interface (12), (d) sensing any deviation of the ship due to its (lateral) drift from the course line (S) over ground, (e) computing in the autopilot a new course necessary to correct the course of the ship and a new angle of incidence of the ship (20) in relation to the predetermined course line (S), and (f) automatically adjusting the heading of the ship to the new course thereby to return the ship to the course line (S) over ground.

* * * * *